(12) United States Patent
Kytsun et al.

(10) Patent No.: US 10,841,570 B2
(45) Date of Patent: Nov. 17, 2020

(54) CALIBRATION DEVICE AND METHOD OF OPERATING THE SAME

(71) Applicant: Samsung Electronics Co., Ltd., Suwon-si, Gyeonggi-do (KR)

(72) Inventors: Petro Kytsun, Kyiv (UA); Iegor Vdovychenko, Kharkov (UA); Alona Vitiuk, Kyiv (UA); Nataliya Sakhnenko, Kharkov (UA); Oleksii Panfilov, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/407,707

(22) Filed: May 9, 2019

(65) Prior Publication Data
US 2020/0014912 A1  Jan. 9, 2020

(30) Foreign Application Priority Data
Jul. 6, 2018 (KR) .................. 10-2018-0078930

(51) Int. Cl.
G01P 13/00 (2006.01)
H04N 17/00 (2006.01)
G06T 7/80 (2017.01)

(52) U.S. Cl.
CPC .......... H04N 17/002 (2013.01); G01P 13/00 (2013.01); G06T 7/80 (2017.01)

(58) Field of Classification Search
CPC .. H04N 13/246; H04N 13/296; H04N 5/2253; H04N 5/23258; H04N 5/23267;
(Continued)

(56) References Cited

U.S. PATENT DOCUMENTS 6,209,383 B1   4/2001  Mueller et al.
8,619,144 B1   12/2013 Chang et al.
(Continued)

OTHER PUBLICATIONS

Gerard Medioni, Sing Bing Kang, Emerging topics in computer vision. Camera calibration, Chapter 2; Prentice Hall PTR Upper Saddle River, NJ, USA ©2004, ISBN:0131013661.
(Continued)

*Primary Examiner* — Paulos M Natnael
(74) *Attorney, Agent, or Firm* — Jefferson IP Law, LLP

(57) ABSTRACT

A calibration method is provided. The calibration method includes capturing an image of a target, acquiring image information of the target, acquiring motion information of a calibration target device by measuring an acceleration of the calibration target device and determining a rotation direction of the calibration target device, matching a first coordinate system corresponding to a camera configured to capture the image of the target and a second coordinate system corresponding to a measurer configured to acquire the motion information of the calibration target device to a third coordinate system, simultaneously performing, based on the third coordinate system, an image calibration operation with respect the image information and a motion calibration operation with respect the motion information, generating calibration motion information via the image calibration operation with respect to the image information, and generating calibration image information via the motion calibration operation with respect to the motion information.

19 Claims, 11 Drawing Sheets

(58) Field of Classification Search
CPC .............. H04N 5/2327; B25J 9/1697; G03B 2207/005
See application file for complete search history.

(56) References Cited

U.S. PATENT DOCUMENTS

| | | | |
|---|---|---|---|
| 9,683,837 B2 | 6/2017 | Siercks | |
| 2003/0038933 A1* | 2/2003 | Shirley | G01B 11/25 356/243.1 |
| 2007/0075997 A1* | 4/2007 | Rohaly | G06T 7/80 345/419 |
| 2007/0229665 A1* | 10/2007 | Tobiason | H04N 5/3572 348/187 |
| 2011/0026014 A1* | 2/2011 | Mack | G03B 13/22 356/124 |
| 2014/0218550 A1* | 8/2014 | Chuang | H04N 5/23248 348/208.6 |
| 2015/0341531 A1* | 11/2015 | Senda | H04N 5/23258 348/308 |
| 2017/0019656 A1 | 1/2017 | Liu et al. | |
| 2017/0032537 A1* | 2/2017 | Li | H04N 17/002 |
| 2017/0039715 A1* | 2/2017 | Yoshioka | H04N 17/002 |
| 2017/0287166 A1* | 10/2017 | Claveau | G06T 7/80 |

OTHER PUBLICATIONS

O.S. Kireyev, Automotive calibration of a stereo pair in laboratory environment; Math. Machines and systems, 2004, No. 1. p. 86-100.
Sebastian O.H. Madgwick, "Automated Calibration of an accelerometers, Magnetometers and Gyroscopes—A feasibility study," Sep. 20, 2010.
Bouguet J.Y., "Camera Calibration Toolbox for Matlab", California Institute of Technology, Pasadena, CA, US online at http://www.vision.caltech.edu/bouguetj/calib_doc/index.html.; Oct. 14, 2015.
R. Hartley & A. Zisserman, "Multiple view geometry in computer vision", chapter 4.1 p. 89, Cambridge University Press 2000, 2003.
Juho Kannala and Sami S. Brandt, "A Generic Camera Model and Calibration Method for Conventional, Wide-Angle, and Fish-Eye Lenses" IEEE Transactions on Pattern Analysis and Machine Intelligence, V. 28, Aug. 2006.
Rainer Kuemmerle et al., "g2o, A General Framework for Graph Optimization", IEEE International Conference on Robotics and Automation (ICRA), 2011.
Google, 3D-cameras on smartphones for VR applications (Google Project Tango, http://podrobnosti.ua/2083006-google-sozdal-smartfon-s-3d-kameroj-video.html), 2016.
Depth sensors (http://scientificrussia.ru/articles/polyarizatsiya-sveta-pozvolit-uvelichit-razreshenie-3d-kamer-v-tysyachu-raz), 2015.
3D laser displays (http://www.dailytechinfo.org/infotech/7462-kompaniya-trilite-technologies-gotovit-nachalo-proizvodstva-ogromnyh-trehmemyh-displeev-v-stile-nazad-v-buduschee.html), 2015.

* cited by examiner

FRONT VIEW

TOP VIEW

401

403

405

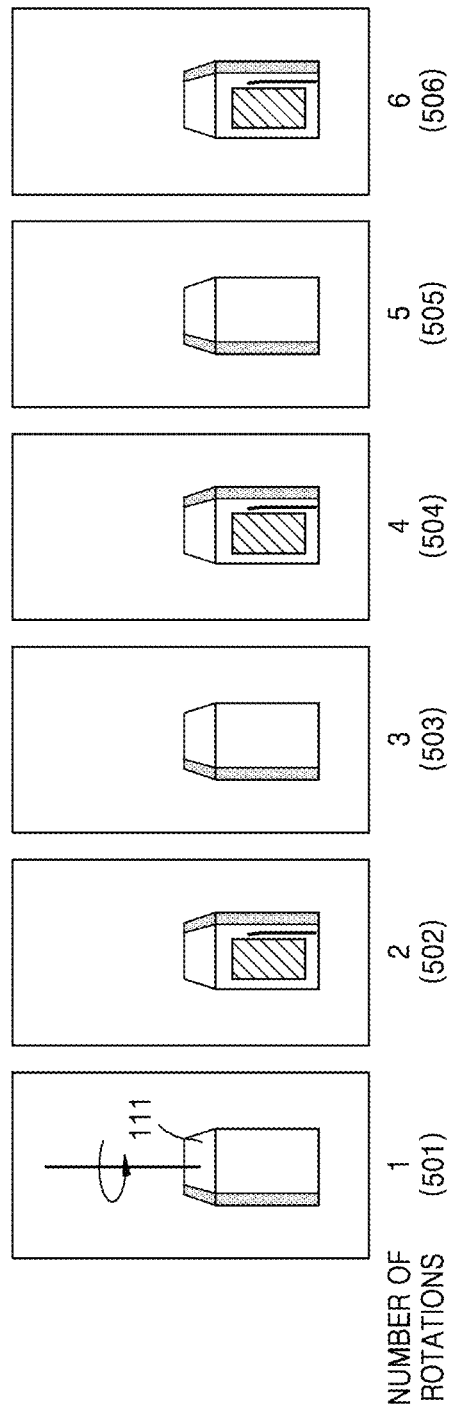

BEFORE CALIBRATION IS APPLIED 601

AFTER CALIBRATION IS APPLIED 603

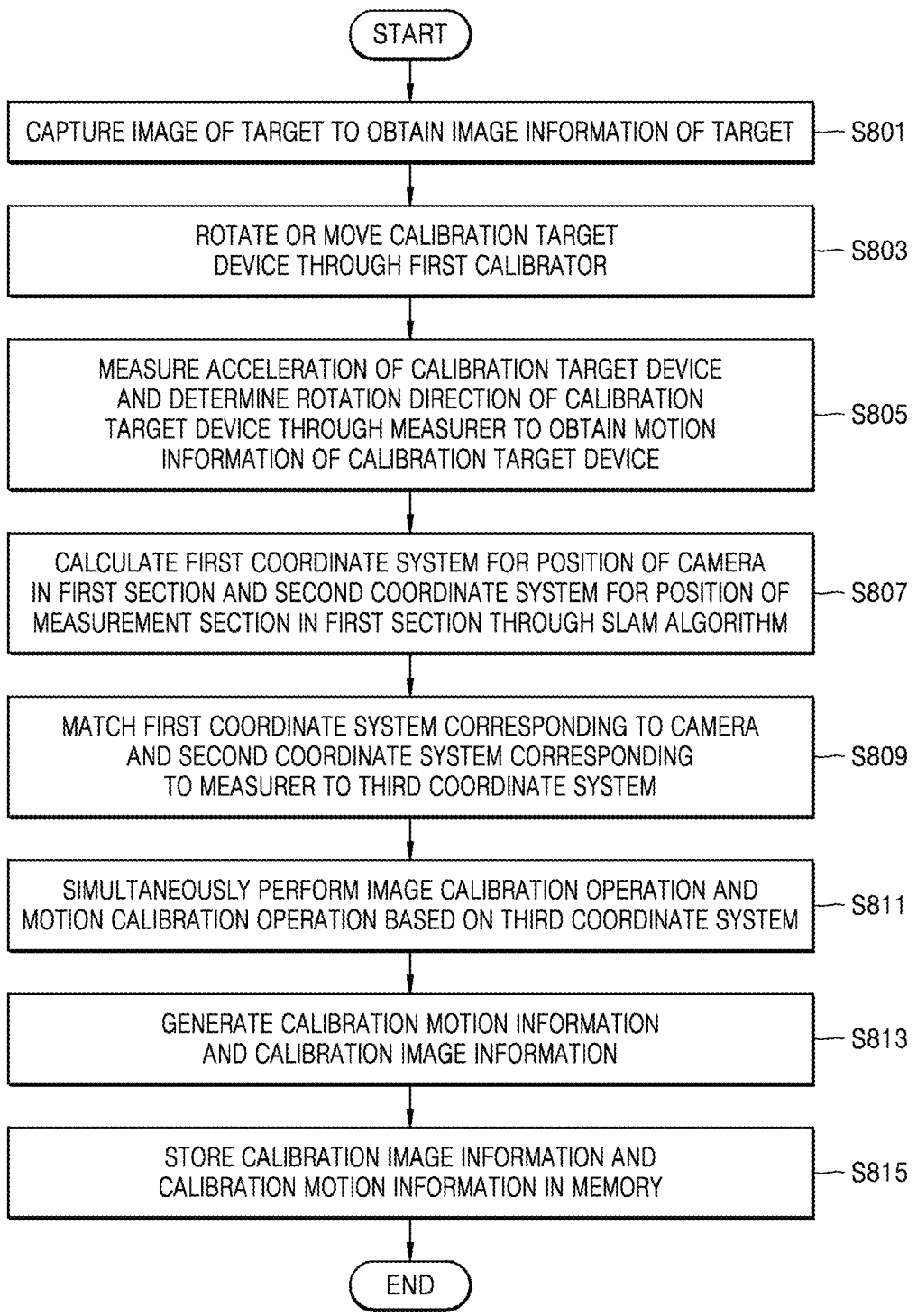

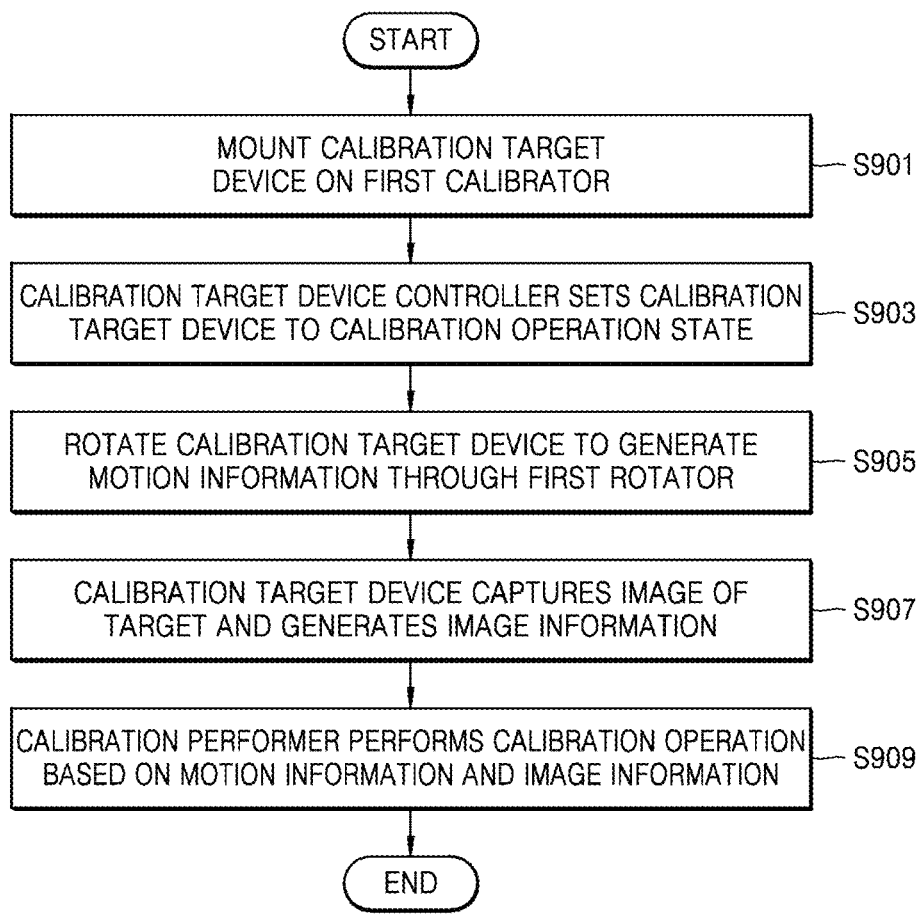

CALIBRATION DEVICE AND METHOD OF OPERATING THE SAME

CROSS-REFERENCE TO RELATED APPLICATION(S)

This application is based on and claims priority under 35 U.S.C. § 119(a) of a Korean patent application number 10-2018-0078930, filed on Jul. 6, 2018, in the Korean Intellectual Property Office, the disclosure of which is incorporated by reference herein in its entirety.

BACKGROUND

1. Field

The disclosure relates to calibration devices and methods of operating the calibration devices.

2. Description of Related Art

With the recent advances in information technology (IT) technology, cameras have evolved from traditional film cameras to digital cameras. Also, in recent years, stereo cameras capable of detecting three-dimensional distances or depths have been developed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide calibration devices with an improved operating range and speed and methods of operating the calibration devices.

Additional aspects will be set forth in part in the description which follows and, in part, will be apparent from the description, or may be learned by practice of the presented embodiments.

In accordance with an aspect of the disclosure, a calibration device is provided. The calibration device includes a first calibrator configured to rotate or move a calibration target device including at least one camera configured to capture an image of target and acquire image information of the target and at least one measurer configured to acquire motion information of the calibration target device based on an acceleration of the calibration target device and a rotation direction of the calibration target device and at least one processor configured to match a first coordinate system corresponding to the at least one camera and a second coordinate system corresponding to the at least one measurer to a third coordinate system, simultaneously perform, based on the third coordinate system, an image calibration operation with respect to the image information and a motion calibration operation with respect to the motion information, and generate calibration motion information via the image calibration operation with respect to the image information, and generate calibration motion information via the motion calibration operation with respect to the motion information.

In accordance with another aspect of the disclosure, a calibration method is provided. The calibration method includes capturing an image of target and acquiring image information of the target, acquiring motion information of the calibration target device by measuring an acceleration of the calibration target device and by determining a rotation direction of the calibration target device and matching a first coordinate system corresponding to a camera configured to capture the image of the target and a second coordinate system corresponding to a measurer configured to acquire the motion information of the calibration target device to a third coordinate system simultaneously performing, based on the third coordinate system, an image calibration operation with respect the image information and a motion calibration operation with respect the motion information, generating calibration motion information via the image calibration operation with respect to the image information, and generating calibration motion information via the motion calibration operation with respect to the motion information.

In accordance with another aspect of the disclosure, a computer program product is provided. The computer program product includes a non-transitory computer readable recording medium including a program to perform operations of, capturing a target and acquiring image information of the target, acquiring motion information of the calibration target device by measuring an acceleration of the calibration target device and by determining a rotation direction of the calibration target device and matching a first coordinate system corresponding to a camera configured to capture an image of the target and a second coordinate system corresponding to a measurer configured to acquire the motion information of the calibration target device to a third coordinate system, simultaneously performing, based on the third coordinate system, an image calibration operation with respect to the image information and a motion calibration operation with respect to the motion information, generating calibration motion information via the image calibration operation with respect to the image information, and generating calibration motion information via the motion calibration operation with respect to the motion information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5A illustrates a method of rotating a calibration target device according to an embodiment of the disclosure;

FIG. 8 is a flowchart illustrating a calibration operating method according to an embodiment of the disclosure; and FIG. 9 is a flowchart illustrating a calibration operating method according to an embodiment of the disclosure.

Throughout the drawings, it should be noted that like reference numbers are used to depict the same or similar elements, features, and structures.

DETAILED DESCRIPTION

Figure 1A:
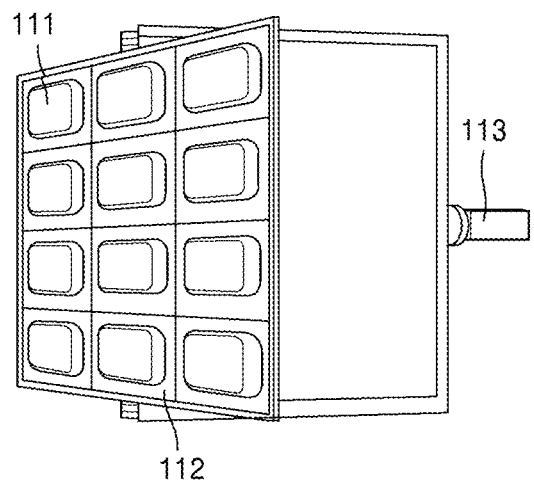
FIG. 1A illustrates a first calibrator according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that, although the terms first, second, etc. may be used herein to describe various elements, these elements should not be limited by these terms. These terms are only used to distinguish one element from another.

The terminology used herein is for the purpose of describing embodiments only and is not intended to be limiting of embodiments. As used herein, the singular forms "a," "an," and "the," are intended to include the plural forms as well, unless the context clearly indicates otherwise. Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

The use of the terms "a" and "an" and "the" and similar referents in the context of describing the disclosure are to be construed to cover both the singular and the plural. Also, the steps of all methods described herein may be performed in any suitable order unless otherwise indicated herein or otherwise clearly contradicted by context. The disclosure is not limited to the described order of the steps.

In the disclosure, the expression 'some embodiments' or 'an embodiment' do not always indicate the same embodiment.

The disclosure may be described in terms of functional block components and various processing steps. Such functional blocks may be realized by any number of hardware and/or software components configured to perform the specified functions. For example, the functional blocks of the disclosure may be implemented by one or more microprocessors or circuit components for a predetermined function. Also, for example, the functional blocks of the disclosure may be implemented with any programming or scripting language. Functional aspects may be implemented in algorithms that are executed on one or more processors. Furthermore, the disclosure could employ any number of techniques according to the related art for electronics configuration, signal processing and/or control, data processing and the like. The words "mechanism", "element", "means", and "configuration" are used broadly and are not limited to mechanical or physical embodiments, but may include software routines in conjunction with processors, etc.

Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

A stereo camera may include a plurality of camera modules and synthesize image data imaged received from the plurality of camera modules and provides a user with an image having a sense of depth. An inertial measurement unit (IMU) is partially embedded in equipment such as unmanned aerial vehicles (drone), airplanes, satellites, etc. and is an integrated unit for measuring the acceleration and rotation rate, i.e., inertia, by using acceleration sensors and gyroscope sensors and also measure a motion in a three-dimensional space. The IMU may also measure the magnetic field for azimuths. Recently, when it is not possible to receive global positioning system (GPS) signals in tunnels, buildings, or spaces where electromagnetic interference is present, a technique for estimating a location based on information of the IMU is useful in a system such as a navigation system (GPS). In modern times, electronic devices basically include cameras and IMUs. To operate the stereo camera and IMU, it is necessary to calibrate each of them.

Hereinafter, the disclosure will be described in detail by explaining preferred embodiments of the disclosure with reference to the attached drawings.

FIG. 1A illustrates a first calibrator according to an embodiment of the disclosure.

Referring to FIG. 1A, a first calibrator 110 according to an embodiment may include a calibration target device 111, a first supporter 112, and a first rotator 113.

The calibration target device 111 according to an embodiment may include at least one camera (not shown) capturing a target (not shown) to obtain image information of the target. The calibration target device 111 may also include at least one measurer (not shown) acquiring motion information of the calibration target device 111 based on at least one sensor of an acceleration sensor (not shown) and a gyroscope sensor (not shown). The calibration target device 111 may include at least one of a camera and an IMU.

A measurer according to an embodiment may mean an IMU. That is, according to an embodiment, the calibration target device 111 may include at least one IMU.

An acceleration sensor measures an acceleration of a moving object or an intensity of an impact between a moving object and an obstacle. An acceleration sensor according to an embodiment may measure an acceleration of the calibration target device 111. A gyroscope sensor is a device measuring the rotational repulsive force generated when an object rotates and converting the rotational repulsive force into an electric signal. A gyroscope sensor according to an embodiment may measure a direction of rotation of the calibration target device 111.

The calibration target device 111 may also include a sensor capable of measuring a velocity, acceleration, azimuth, tilt, gravity, rotation, geomagnetic field, and magnetic field, including the acceleration sensor and the gyroscope sensor. That is, the motion information described in an embodiment may mean information about velocity, acceleration, azimuth, tilt, gravity, rotation, geomagnetic field, and magnetic field.

The calibration target device 111 according to an embodiment may include a mobile phone, a tablet, a smart watch, a surround view device, a TV, a computer, a notebook, a virtual reality device, an augmented reality device, a mixed reality device, a video security device, a navigation device, and the like. It should be noted, however, that according to a type of the calibration target device 111, the calibration target device 111 of a specific type may not include the IMU.

When the camera included in the calibration target device 111 captures an image of the target before calibration is performed, the captured image may basically include distorted information. Therefore, a calibration device 100 according to an embodiment may be used to calibrate the calibration target device 111 including the camera that captured the image with respect to distorted information. The calibration target device 111 on which calibration is performed may obtain image information more similar to an actual image of the captured image of the target than before calibration is performed.

According to a similar principle, when motion occurs in the calibration target device 111 before calibration on the IMU is performed, motion information generated by the IMU may basically include distorted information. Accordingly, the calibration device 100 according to an embodiment may calibrate the IMU included in the calibration target device 111 with respect to the generated motion information. The calibration target device 111 on which calibration is performed may obtain more accurate motion information than before calibration is performed.

The first supporter 112 according to an embodiment may support the calibration target device 111 to be positioned within the calibration device 100. As shown in FIG. 1A, the first supporter 112 may support more than one calibration target device 111. For example, as shown in FIG. 1A, the first supporter 112 may simultaneously support the twelve calibration target devices. By simultaneously supporting the plurality of calibration target devices, the calibration device 100 according to an embodiment may simultaneously perform a calibration operation on the plurality of calibration target devices. Accordingly, when there are the plurality of calibration target devices on which calibration is to be performed, the calibration operation may be simultaneously performed, thereby reducing the time for performing the entire calibration operation.

According to an embodiment, the first calibrator 110 may include the first rotator 113 that allows the calibration target device 111 to generate the motion information.

The first rotator 113 (or a rotation mover) according to an embodiment may perform a movement or rotation operation such that the calibration target device 111 may generate the motion information. According to an embodiment, the first rotator 113 may rotate in a 360-degree direction to move the calibration target device 111. According to an embodiment, the first rotator 113 may repeatedly move the calibration target device 111 by a predetermined angle. The first rotator 113 according to an embodiment may move the calibration target device 111 such that the acceleration sensor and the gyroscope sensor may measure information about a velocity, azimuth, tilt, magnetic field, etc. The IMU may acquire the motion information of the calibration target device 111 in accordance with the movement or rotation operation of the first rotator 113 according to an embodiment. The first rotator 113 according to an embodiment may be a device including all physical devices capable of moving the calibration target device 111.

According to an embodiment, the first calibrator 110 may include a processor (not shown). The processor according to an embodiment may match a first coordinate system corresponding to the camera and a second coordinate system corresponding to the measurer to a third coordinate system and, based on the third coordinate system, simultaneously perform an image calibration operation on the image information and a motion calibration operation on the motion information, thereby generating calibration motion information, which is a result obtained by calibrating the image information and calibration motion information, which is a result obtained by calibrating the motion information. The operation of the processor will be described in more detail later with reference to FIG. 2.

Figure 1B:
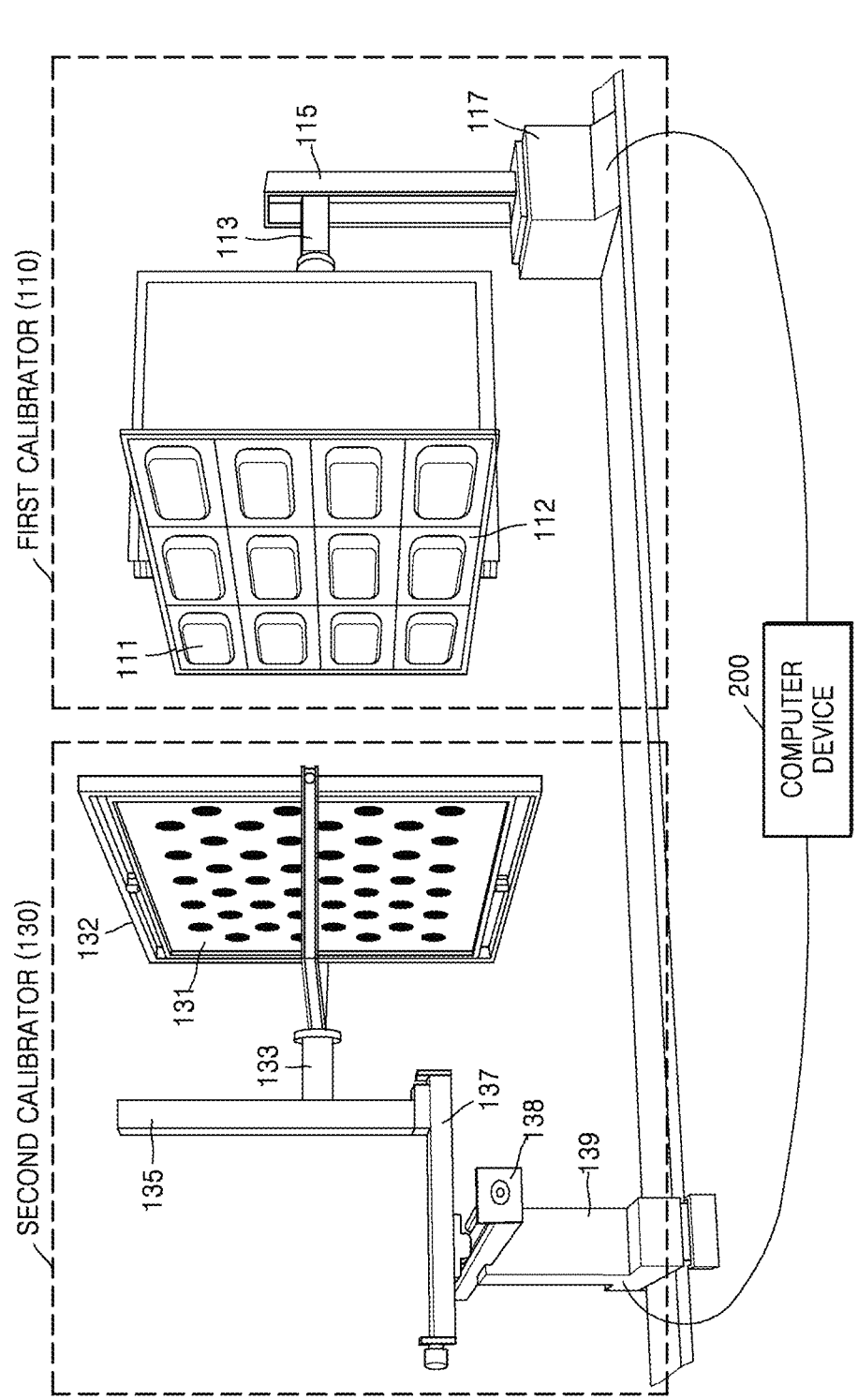
FIG. 1B illustrates a calibration device according to an embodiment of the disclosure.

FIG. 1B illustrates a calibration device according to an embodiment of the disclosure.

Referring to FIG. 1B, the calibration device 100 according to an embodiment may include the first calibrator 110 described with reference to FIG. 1A and further include a second calibrator 130 and a computer device 200. That is, the calibration device 100 according to an embodiment may include the first calibrator 110, the second calibrator 130, and the computer device 200.

The first calibrator 110 according to an embodiment may further include the first rotator 113, a first mover 115, and a second mover 117. That is, the first calibrator 110 according to an embodiment may include the calibration target device 111, the first supporter 112, the first rotator 113, the first mover 115, and the second mover 117.

The first calibrator 110 according to an embodiment may include the first mover 115 capable of moving the calibration target device 111 in a Z axis direction. The first mover 115 may move the calibration target device 111 in the Z axis direction to a position at a distance suitable for a camera of the calibration target device 111 to capture an image of a target 131.

The first calibrator 110 according to an embodiment may include the second mover 117 capable of moving the calibration target device 111 in a Y axis direction. The second mover 117 may adjust a distance between the calibration target device 111 and the target 131 by moving the calibration target device 111 in the Y axis direction.

The second calibrator 130 according to an embodiment may include the target 131, a second supporter 132, a second rotator 133, a third mover 135, a fourth mover 137, a fifth mover 138, and a sixth mover 139.

The target 131 according to an embodiment may be a display device for calibrating the camera included in the calibration target device 111. The target 131 may be an electronic display device or a plate directly replaceable by a user.

The calibration target device 111 according to an embodiment may acquire image information of the target 131 by capturing the target 131.

The second supporter 132 according to an embodiment may support the target 131. In FIG. 1B, the second supporter 132 supports the target 131, but according to another embodiment, more than one second supporter 132 may be provided to respectively support more than one target 131.

The second rotator 133 according to an embodiment may be connected to the second supporter 132 to rotate the second supporter 132, thereby rotating the target 131. The second rotator 133 may rotate the target 131 to position the target 131 at a position suitable for the camera of the calibration target device 111 to capture the image of the target 131.

The third mover 135 according to an embodiment may be connected to the second rotator 133 or the second supporter 132. The third mover 135 may move in the Z-axis direction such that the target 131 may move in the Z-axis direction. The third mover 135 may move the target 131 in the Z axis direction to position the target 131 at the position suitable for the camera of the calibration target device 111 to capture the image of the target 131.

The fourth mover 137 according to an embodiment may be connected to the third mover 135. The fourth mover 137 may move the third mover 135 in the Y-axis direction such that the target 131 may move in the Y-axis direction. The fourth mover 137 may move the target 131 in the Y axis direction to position the target 131 at the position suitable for the camera of the calibration target device 111 to capture the image of the target 131.

The fifth mover 138 according to an embodiment may be connected to the fourth mover 137. The fifth mover 138 may move the fourth mover 137 in the X axis direction such that the target 131 may in the X axis direction. The fifth mover 138 may move the target 131 in the X axis direction to position the target 131 at the position suitable for the camera of the calibration target device 111 to capture the image of the target 131.

The sixth mover 139 according to an embodiment may be connected to the fifth mover 138. The sixth mover 139 may move the fifth mover 138 in the Y-axis direction such that the target 131 may move in the Y-axis direction. The sixth mover 139 may move the target 131 in the Y axis direction to position the target 131 at the position suitable for the camera of the calibration target device 111 to capture the image of the target 131.

The coupling relationship among the third mover 135, the fourth mover 137, the fifth mover 138, and the sixth mover 139 according to an embodiment is not limited to the coupling relationship shown in FIG. 1B. For example, although the third mover 135 is directly coupled to the fourth mover 137 in FIG. 1B, in another embodiment, the third mover 135 may be directly connected to the fifth mover 138. In another embodiment, the third mover 135, the fourth mover 137, the fifth mover 138, and the sixth mover 139 may move in the X, Y, and Z axes as one integrated device.

The computer device 200 according to an embodiment may be connected to the first calibrator 110 and the second calibrator 130 through a communication path 104.

The communication path 104 may be a network of various kinds. For example, the communication path may include wireless communication, wired communication, optical communication, ultrasonic communication, or a combination thereof. The communication path 104 may also include satellite communication, mobile communication, Bluetooth, WiFi, infrared data association standard (IrDA), WiMAX, and the like. Ethernet, digital subscriber line (DSL), fiber to the home (FTTH), and existing general telephone services are also examples of wired communication that may be included in the communication path.

According to an embodiment, the computer device 200 may be included in the first calibrator 110 integrally with the first calibrator 110 or may be included in the second calibrator 130 integrally with the second calibrator 130. According to an embodiment, the first calibrator 110 may include the computer device 200, and the first calibrator 110 may include a processor.

Figure 2:
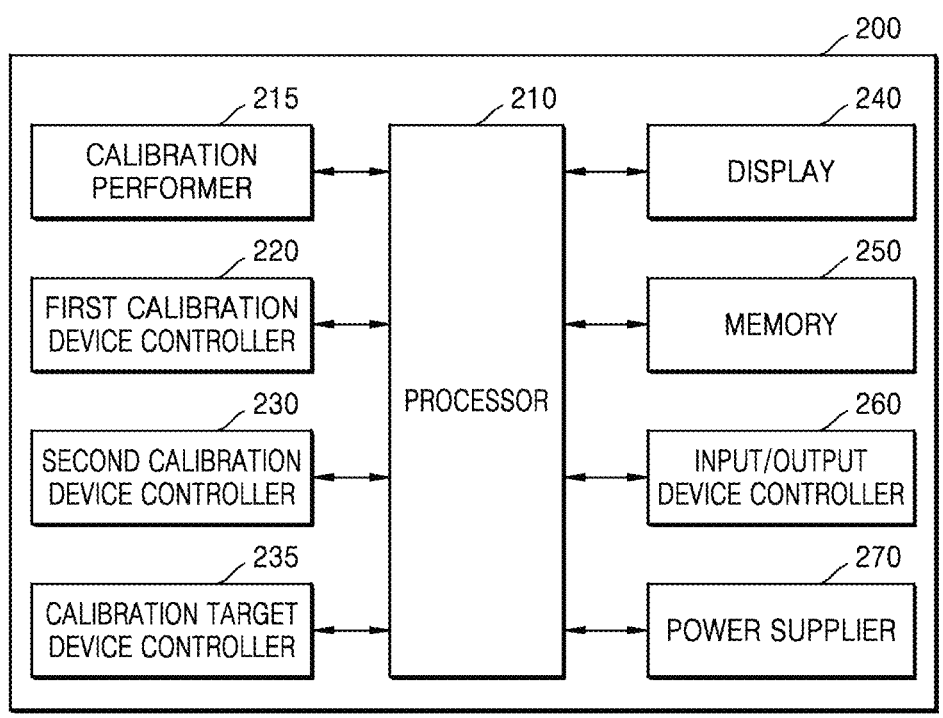
FIG. 2 illustrates a configuration of a computer device according to an embodiment of the disclosure.

FIG. 2 illustrates a configuration of a computer device according to an embodiment of the disclosure.

Referring to FIG. 2, the computer device 200 according to an embodiment may include a processor 210, a calibration performer 215, a first calibration device controller 220, a second calibration device controller 230, a calibration target device controller 235, a display 240, a memory 250, an input/output device controller 260, and a power supplier 270.

The processor 210 according to an embodiment may control each of the calibration performer 215, the first calibration device controller 220, the second calibration device controller 230, the calibration target device controller 235, the display 240, the memory 250, the input/output device controller 260, and the power supplier 270. The processor 210 may include one or more of a central processing unit, an application processor, or a communication processor (CP). The processor 120 may perform, for example, operations or data processing relating to control and/or communication of at least one other component of an electronic device.

The processor 210 according to an embodiment may include at least one of the calibration performer 215, the first calibration device controller 220, the second calibration device controller 230, and the calibration target device controller 235. That is, the processor 210 may perform an operation of at least one of the calibration performer 215, the first calibration device controller 220, the second calibration device controller 230, and the calibration target device controller 235.

The processor 210 according to an embodiment may generate calibration motion information based on the first calibrator 110 and generate calibration image information based on the second calibrator 130.

The calibration performer 215 according to an embodiment may generate at least one of the calibration motion information and the calibration image information, based on at least one of image information of the target 131 received from the first calibrator 110 or the first calibration device controller 220 and motion information of a calibration target device.

The calibration performer 215 according to an embodiment may match a first coordinate system corresponding to a camera and a second coordinate system corresponding to an IMU to a third coordinate system, which is a standard coordinate system.

The first coordinate system corresponding to the camera may be a coordinate system set with reference to the camera. In an embodiment, when the center of a lens included in the camera is the origin of the coordinate system, the coordinate system may be set such that a front optical axis direction of the camera is a Z axis, a downward direction of the camera is a Y axis, and a right direction of the camera is an X axis.

The second coordinate system corresponding to the IMU may be a coordinate system set with reference to the IMU. In an embodiment, when the center of the IMU is the origin of the coordinate system, the coordinate system may be set such that a front direction of the center of the IMU is the Z axis, a downward direction of the center of the IMU is the Y axis, and a right direction of the center of the IMU is the X axis.

The third coordinate system, which is the standard coordinate system, may be a coordinate system that unifies the first and second coordinate systems that are different from each other. By unifying the first and second coordinate systems which are different from each other into the third coordinate system, the calibration performer 215 according to an embodiment may simultaneously perform an image calibration operation and a motion calibration operation. In other words, the image calibration operation on the first coordinate system and the motion calibration operation on the second coordinate system are not separately performed, and the first and second coordinate systems may be matched to the third coordinate system, and then the image calibration operation and the motion calibration operation may be simultaneously performed on the third coordinate system. Accordingly, the calibration performer 215 according to an embodiment may quickly perform a calibration operation.

The calibration performer 215 according to an embodiment may match the first coordinate system corresponding to the camera and the second coordinate system corresponding to the IMU, which are determined through a simultaneous localization and mapping (SLAM) algorithm, to the third coordinate system, which is the standard coordinate system.

The SLAM algorithm may be an algorithm that simultaneously performs position measurement and mapping. The SLAM algorithm may include a localization process of self-locating and a mapping process of registering an image.

The calibration performer 215 according to an embodiment may calculate a position of the camera in a first section through the SLAM algorithm Accordingly, the calibration performer 215 may calculate a trajectory of a movement of the camera during the calibration operation. The first coordinate system corresponding to the camera may be a coordinate system with respect to the position of the camera in the first section.

Also, the calibration performer 215 according to an embodiment may calculate a position of the IMU in the first section through the SLAM algorithm Accordingly, the calibration performer 215 may calculate a trajectory of a movement of the IMU during the calibration operation. The second coordinate system corresponding to the IMU may be a coordinate system with respect to the position of the IMU in the first section.

The first section may be a time interval between first and second points of time that are 2 points of time. Each of the first and second points of time may be a predetermined point of time necessary for performing the calibration operation. For example, a point of time when the camera captures the image of the target 131 is the first point of time, and a point of time after movement occurs in the calibration target device through the first rotator 113 may be the second point of time. However, the first and second points of time are merely examples, and each of the first and second points of time may be any point of time designated among time for performing the calibration operation. Each of the first and second points of time may be a point of time designated by the user or a predetermined point of time.

The trajectory of movement of the camera may include position and orientation information of the camera between fixed points of time. The calibration performer 215 may calculate information about movement occurred in a camera coordinate system during a period between the first and second points of time from a direction of the camera with respect to each of the first and second points of time. The trajectory of the IMU may include position and orientation information of the IMU at each fixed point of time. The calibration performer 215 may calculate information about movement occurred in an IMU coordinate system during the period between the first and second points of time from a direction of the IMU with respect to any two points of time.

The calibration performer 215 according to an embodiment may calculate a transformation matrix for transforming the first coordinate system and the second coordinate system into the third coordinate system with a minimum error to calibrate the camera and the IMU. The transformation matrix may be a predetermined matrix value used in performing coordinate transformation, which is an operation of changing coordinates of one coordinate system to coordinates of another coordinate system.

In calculating the transformation matrix, the Gauss-Newton method for solving the nonlinear least squares problem may be used. The Gauss-Newton method may be an extension of the Newton's method, which is a method used to approximate the solution of an equation, to the form of simultaneous equations.

The first calibration device controller 220 according to an embodiment may control each of the calibration target device 111, the first supporter 112, the first rotator 113, the first mover 115 and the second mover 117 that are included in the first calibrator 110.

The first calibration device controller 220 may control the calibration target device 111 to control the camera and the IMU included in the calibration target device 111. The first calibration device controller 220 may acquire image information of the target 131 by controlling the camera and capturing the target 131.

The first calibration device controller 220 may control the first supporter 112 such that the first supporter 112 may support the calibration target device 111. The first calibration device controller 220 may control the first rotator 113 such that the calibration target device 111 may generate motion information. The first calibration device controller 220 may control the first mover 115 to move the calibration target device 111 in a Z axis direction. The first calibration device controller 220 may control the second mover 117 to move the calibration target device 111 in a Y axis direction.

The second calibration device controller 230 according to an embodiment may control each of the target 131, the second supporter 132, the second rotator 133, the fourth mover 137, the fifth mover 138, and the sixth mover 139 that are included in the second calibrator 130.

The second calibration device controller 230 may display an image suitable for the calibration target device 111 to acquire image information of the target 131 on the target 131. However, this is only an embodiment, and as described above, the target 131 may be a plate directly replaceable by a user.

The second calibration device controller 230 may control the second supporter 132 to fix the target 131. The second calibration device controller 230 may control the second rotator 133 to rotate the target 131. The second calibration device controller 230 may control the third mover 135 to move the target 131 in the Z-axis direction. The second calibration device controller 230 may control the fourth mover 137 to move the target 131 in the Y axis direction. The second calibration device controller 230 may control the fifth mover 138 to move the target 131 in the X axis direction. The second calibration device controller 230 may control the sixth mover 139 to move the target 131 in the Y axis direction.

The calibration target device controller 235 according to an embodiment may control the calibration target device 111 supported by the first supporter 112 of the first calibrator 110. According to an embodiment, the calibration target device controller 235 may set the calibration target device 111 to a calibration operation state. The calibration operation state may mean a preparation state of at least one of hardware and software of the calibration target device 111 for performing at least one calibration operation among the image calibration operation and the motion calibration operation. In an embodiment, the calibration operation state may mean a state in which the software for the calibration operation is executed.

The display 240 according to an embodiment may include a set of devices for displaying a state of the computer device 200. The display 240 may be a device attached to the computer device 200 or a device present outside the computer device 200. The processor 210 may control the display 240 to display the operation state of the computer device 200.

The memory 250 according to an embodiment may include volatile and/or non-volatile memory. The memory 250 may store instructions or data related to, for example, at least one other component of an electronic device. According to an embodiment, the memory 250 may store software and/or programs. According to an embodiment, the memory may store the calibration image information and the calibration motion information.

The memory 250 may include, for example, an internal memory or an external memory. The internal memory may include at least one of, for example, a volatile memory (e.g., dynamic random-access memory (DRAM), static RAM (SRAM), or synchronous DRAM (SDRAM), a non-volatile memory (e.g., an one time programmable (OTPROM), a programmable ROM (PROM), an erasable PROM (EPROM), an electronically EPROM (EEPROM), a mask ROM, a flash ROM, a flash memory, a hard drive, a solid state drive (SSD). The external memory may include a flash drive, for example, a compact flash (CF), a secure digital (SD), Micro-SD, Mini-SD, a multi-media card (MMC), a memory stick, etc. The external memory may be functionally or physically connected to the electronic device through various interfaces.

The input/output device controller 260 according to an embodiment may be a device that encompasses devices for the user to interact with the computer device 200. For example, the input/output device controller 260 may be a device that controls an input/output device such as a mouse, a keyboard, a monitor, etc. The processor 210 may control the input/output device controller 260 to enable the user to interact with the computer device 200.

The power supplier 270 according to an embodiment may supply power necessary for the operation of the computer device 200. The processor 210 may control the power supplied by the power supplier 270.

However, in the above-described embodiment, it is assumed that the computer device 200 exists as a separate device from the first calibrator 110 and the second calibrator 130, but the computer device 200 may be included in at least one of the first calibrator 110 and the second calibrator 130 in another embodiment. For example, the first calibrator 110 may include the computer device 200. That is, the first calibrator 110 may include the processor 210 included in the computer device 200. Therefore, the processor 210 included in the first calibrator 110 may match the first coordinate system corresponding to the camera and the second coordinate system corresponding to the measurer to the third coordinate system, and based on the third coordinate system, simultaneously perform the image calibration operation on the image information and the motion calibration operation on the motion information, thereby generating calibration motion information which is a result obtained by calibrating the image information and calibration motion information which is a result obtained by calibrating the motion information.

Figure 3A:
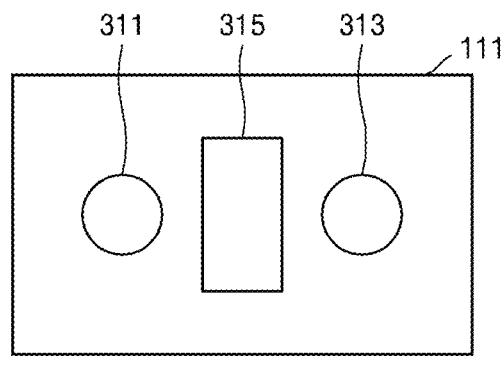
FIG. 3A shows a front view of a calibration target device according to an embodiment of the disclosure.

FIG. 3A shows a front view of a calibration target device according to an embodiment of the disclosure.

Referring to FIG. 3A, the calibration target device 111 according to an embodiment may include a plurality of cameras 311 and 313 and a single IMU 315. However, the number, sizes, and positions of each of cameras and IMUs may vary according to a type of the calibration target device 111. For example, when the calibration target device 111 is a mobile phone or tablet, the calibration target device 111 may include a single camera and a single IMU. When the calibration target device 111 is a smart watch or a navigation device, the calibration target device 111 may include a plurality of IMUs having a relatively large sensor.

As shown in FIG. 3A, the plurality of cameras 311 and 313 and the single IMU 315 may be different from each other in the size and position. For example, the single IMU 315 may be larger than the plurality of cameras 311 and 313. This may mean that there is a difference between the center of the single IMU 315 and the center of the plurality of cameras 311 and 313.

Accordingly, the calibration performer 215 according to an embodiment may match a first coordinate system corresponding to a camera and a second coordinate system corresponding to an IMU to a third coordinate system which is a standard coordinate system through a SLAM algorithm The calibration performer 215 according to an embodiment may perform a calibration operation based on the third coordinate system to quickly perform image calibration and motion calibration.

Figure 3B:
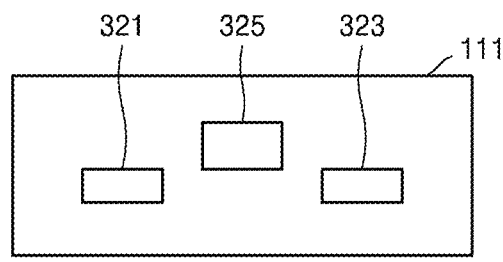
FIG. 3B shows a top view of a calibration target device according to an embodiment of the disclosure.

FIG. 3B shows a top view of a calibration target device according to an embodiment of the disclosure.

Referring to FIG. 3B, a plurality of cameras 321 and 323 and a single IMU 325 may be different from each other in the size and position. For example, the single IMU 325 may be in a somewhat higher position in a plan view than the plurality of cameras 321 and 323. This may mean that the center of the single IMU 325 is located at a position higher than the center of the plurality of cameras 321 and 323.

Accordingly, the calibration performer 215 according to an embodiment may match a first coordinate system corresponding to a camera and a second coordinate system corresponding to an IMU to a third coordinate system which is a standard coordinate system through a SLAM algorithm The calibration performer 215 according to an embodiment may perform a calibration operation based on the third coordinate system to quickly perform image calibration and motion calibration.

Figure 4:
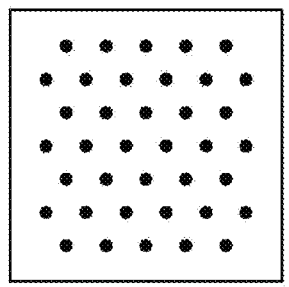
FIG. 4 illustrates examples of a target according to an embodiment of the disclosure.
Figure 4:
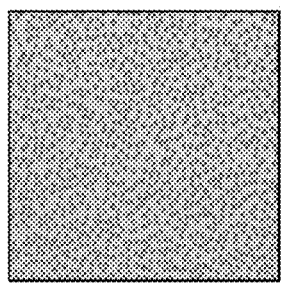
Figure 4:
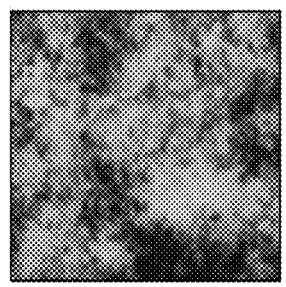

FIG. 4 illustrates examples of a target according to an embodiment of the disclosure.

Referring to FIG. 4, the target 131 according to an embodiment may be a display device for calibrating a camera included in the calibration target device 111. The target 131 may be an electronic display device or a plate directly replaceable by a user.

The target 131 according to an embodiment may be an image in which a certain pattern is repeated or an image that is easy to measure a distortion state of the camera.

For example, as shown in FIG. 4, a first pattern 401 shows that circular patterns of predetermined sizes are regularly arranged at regular intervals, a second pattern 403 shows that circular patterns of small sizes are irregularly arranged, and a third pattern 405 shows that white and black patterns are irregularly mixed without a specific figure.

The first pattern 401, the second pattern 403 and the third pattern 405 may be used alone or in combination for an image calibration operation of the calibration target device 111.

FIG. 5A illustrates a method of rotating a calibration target device according to an embodiment of the disclosure.

Referring to FIG. 5A, the first calibrator 110 may include the first rotator 113 that allows the calibration target device 111 to generate motion information.

According to an embodiment, the calibration target device 111 may include at least one IMU acquiring the motion information of the calibration target device 111 based on at least one sensor of an acceleration sensor and a gyroscope sensor.

The first rotator 113 according to an embodiment may perform movement and rotation operations such that the calibration target device 111 may generate the motion information. According to an embodiment, the first rotator 113 may repeatedly move the calibration target device 111 at a predetermined angle. As shown in FIG. 5A, the first rotator 113 may rotate in a 180 degree direction to move the calibration target device 111. The first rotator 113 may rotate the calibration target device 111 six times in the 180 degree direction including the number of rotation 1 501, the number of rotation 2 502, the number of rotation 3 503, the number of rotation 4 504, the number of rotation 5 505, and the number of rotation 6 506.

The first rotator 113 according to an embodiment may move the calibration target device 111 such that an acceleration sensor and a gyroscope sensor may measure information about velocity, azimuth, tilt, and magnetic field.

Figure 5B:
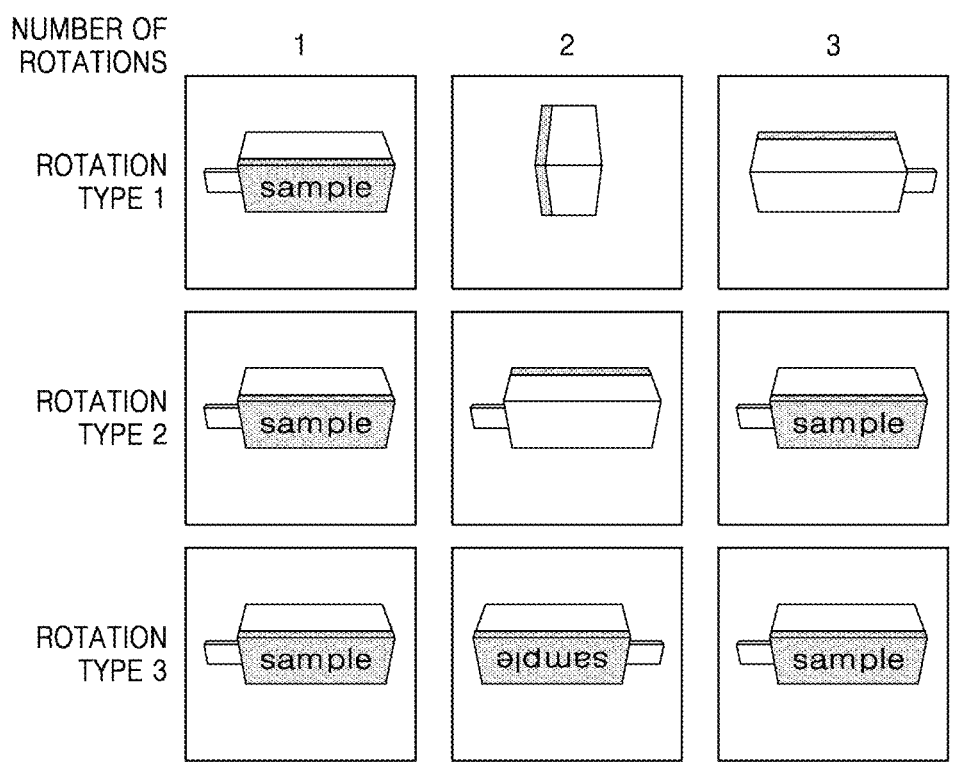
FIG. 5B illustrates a method of rotating a calibration target device according to an embodiment of the disclosure.

FIG. 5B illustrates another embodiment of a method of rotating a calibration target device according to an embodiment of the disclosure.

Referring to FIG. 5B, the first rotator 113 may repeatedly move the calibration target device 111 at a predetermined angle. As shown in FIG. 5B, the first rotator 113 may move the calibration target device 111 in a 90 or 180 degree direction.

Figure 6:
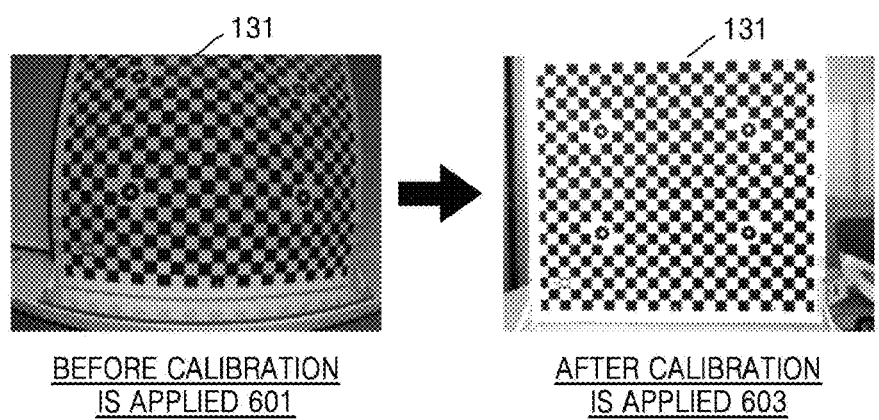
FIG. 6 shows a calibration operation result according to an embodiment of the disclosure.

FIG. 6 shows a calibration operation result according to an embodiment of the disclosure.

Referring to FIG. 6, before calibration is applied 601, the image of the target 131 captured by the calibration target device 111 may be somewhat distorted. Specifically, while the target 131 has an actually flat shape, the distorted image of the target 131 may have a bent upper portion.

After calibration is applied 603 to the calibration target device 111 according to an embodiment, the image of the target 131 captured by the calibration target device 111 may be similar to the actual shape of the target 131.

Figure 7:
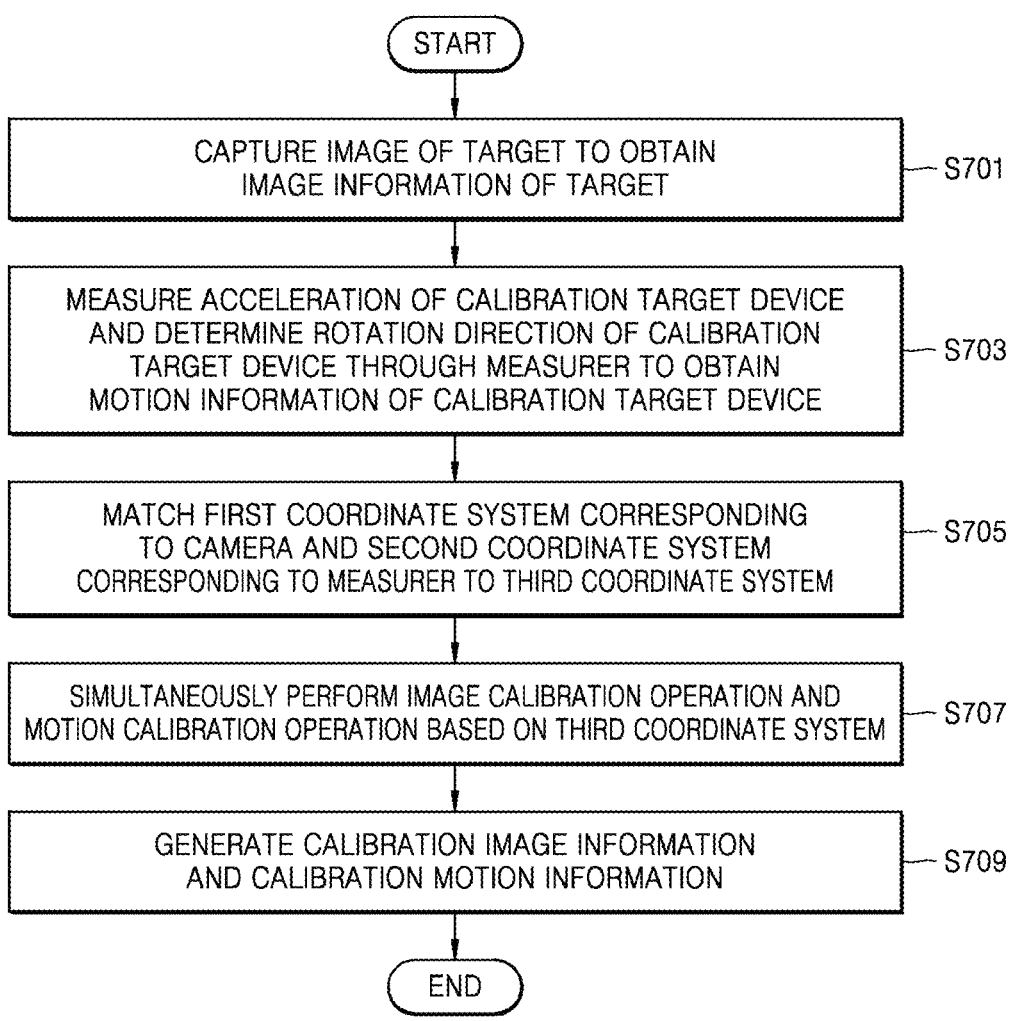
FIG. 7 is a flowchart illustrating a calibration operating method according to an embodiment of the disclosure.

FIG. 7 is a flowchart illustrating a calibration operating method according to an embodiment of the disclosure.

Referring to FIG. 7, in operation S701, a camera according to an embodiment may capture an image of the target 131 to obtain image information of the target 131.

In operation S703, the processor 210 according to an embodiment may measure the acceleration of the calibration target device 111 and the rotation direction of the calibration target device 111 through a measurer to obtain motion information of the calibration target device 111.

In operation S705, the processor 210 according to an embodiment may match a first coordinate system corresponding to the camera and a second coordinate system corresponding to the measurer to a third coordinate system.

In operation S707, the processor 210 according to an embodiment may simultaneously perform an image calibration operation and a motion calibration operation based on the third coordinate system.

In operation S709, the processor 210 according to an embodiment may generate calibration image information, which is a result obtained by calibrating the image information and calibration motion information, which is a result obtained by calibrating the motion information.

FIG. 8 is a flowchart illustrating a calibration operating method according to another embodiment of the disclosure.

Referring to FIG. 8, in operation S801, a camera according to an embodiment may capture the image of the target 131 to obtain image information of the target 131.

In operation S803, the processor 210 according to an embodiment may rotate or move the calibration target device 111 through the first calibrator 110.

In operation S805, the processor 210 according to an embodiment may measure the acceleration of the calibration target device 111 and the rotation direction of the calibration target device 111 through a measurer to obtain motion information of the calibration target device 111.

In operation S807, the processor 210 according to an embodiment may calculate a first coordinate system for the position of the camera in the first section and a second coordinate system for the position of the measurement section in the first section through the SLAM algorithm In operation S809, the processor 210 according to an embodiment may match a first coordinate system corresponding to the camera and a second coordinate system corresponding to the measurer to a third coordinate system.

In operation S811, the processor 210 according to an embodiment may simultaneously perform an image calibration operation and a motion calibration operation based on the third coordinate system.

In operation S813, the processor 210 according to an embodiment may generate calibration motion information, which is a result obtained by calibrating the image information, and calibration image information, which is a result obtained by calibrating the motion information.

In operation S815, the processor 210 according to an embodiment may store the calibration image information and the calibration motion information in the memory 250.

FIG. 9 is a flowchart illustrating a calibration operating method according to another embodiment of the disclosure.

Referring to FIG. 9, in operation S901, a user may mount the calibration target device 111 on the first calibrator 110. Specifically, the first supporter 112 according to an embodiment may support the calibration target device 111 to be positioned inside the calibration device 100. Therefore, the user may mount the calibration target device 111 to the first calibrator 110 through the first supporter 112.

In operation S903, the calibration target device controller 235 according to an embodiment may set the calibration target device 111 to a calibration operation state. The calibration operation state may mean a hardware/software preparation state of the calibration target device 111 for performing at least one calibration operation among an image calibration operation and a motion calibration operation. In an embodiment, the calibration operation state may mean a state in which software for the calibration operation is executed.

In operation S905, the first calibration device controller 220 according to an embodiment may rotate the calibration target device 111 to generate motion information. The first rotator 113 according to an embodiment may perform movement and rotation operations such that the calibration target device 111 may generate motion information.

In operation S907, the calibration target device controller 235 according to an embodiment may control the calibration target device 111 to capture the image of the target 131 and generate image information.

In operation S909, the calibration performer 215 according to an embodiment may perform the calibration operation on the calibration target device 111 based on at least one of the motion information and the image information received from the first calibrator 110.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

Those of ordinary skill in the art would understand the block diagrams disclosed in the disclosure as conceptual diagrams of circuits for realizing the principles of the disclosure Similarly, it would be apparent to those of ordinary skill in the art that arbitrary flow charts, flow diagrams, state transition diagrams, pseudo code, and the like denote various processes that may be substantially stored in a computer-readable recording medium and that may be performed by a computer or a processor, regardless of whether the computer or the processor are explicitly illustrated or not. Thus, the embodiments of the disclosure described above may be embodied as a computer program. The computer program may be stored in a computer-readable recording medium, and executed using a general digital computer. Examples of the computer-readable medium are a magnetic recording medium (a ROM, a floppy disc, a hard disc, etc.), and an optical recording medium (a compact disc (CD)-ROM, a digital versatile disc (DVD), etc.).

The functions of various elements illustrated in the drawings may be related to appropriate software, and be provided via not only hardware capable of executing the software but also exclusive hardware. These functions may also be provided via a single exclusive processor, a single shared processor, or a plurality of individual processors, some of which may be shared. Also, explicit use of the term 'processor' or 'controller' is not limited to exclusively using hardware capable of executing software, and may implicitly include hardware such as a digital signal processor (DSP), and a ROM, a RAM, or a non-volatile storage medium for storing software.

In the claims of the present specification, an element suggested as an element for performing a specific operation includes any arbitrary methods of performing the specific operation. Examples of this element may include a combination of circuit elements capable of performing the specific operation, or software having an arbitrary form, e.g., firmware or microcode, which is combined with an appropriate circuit for executing software for performing the specific operation.

In the disclosure, the expression 'an embodiment' of the principles of the disclosure and various modifications of this expression mean that specific features, structure, and characteristics related to this embodiment are included in at least an embodiment of the principles of the disclosure. Thus, the expression 'an embodiment' and arbitrary other modifications thereof disclosed in the disclosure do not always indicate the same embodiment.

In the disclosure, the expression 'at least one of' of 'at least one of A and B' is used to inclusively mean that only the first option (A) is selected, only the second option (B) is selected, or both the first and second operations (A and B) are selected. In addition, the expression 'at least one of A, B, and C' is used to inclusively mean that only the first option (A) is selected, only the second option (B) is selected, only the third option (C) is selected, only the first and second options (A and B) are selected, only the second and third options (B and C) are selected, only the first and third (A and C) are selected or all the three options (A, B, and C) are selected. When more than three items are listed in relation to this expression, the meaning thereof would be apparent to those of ordinary skill in the art.

The embodiments of the disclosure have been described above.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A calibration device comprising:
a first calibrator configured to rotate or move a calibration target device, the calibration target device comprising:
a plurality of cameras configured to capture an image of a target and acquire image information of the target, and
at least one measurer configured to acquire motion information of the calibration target device based on an acceleration of the calibration target device and a rotation direction of the calibration target device; and
at least one processor configured to:
match a first coordinate system, the first coordinate system corresponding to the plurality of cameras, to a third coordinate system,
match a second coordinate system, the second coordinate system corresponding to the at least one measurer, to the third coordinate system,
simultaneously perform, based on the third coordinate system, an image calibration operation with respect to the image information and a motion calibration operation with respect to the motion information,
generate calibration motion information via the image calibration operation with respect to the image information, and
generate calibration image information via the motion calibration operation with respect to the motion information,
wherein the third coordinate system is a standard coordinate system that unifies the first and second coordinate systems that are different from each other.

2. The calibration device of claim 1, wherein the first coordinate system and the second coordinate system are matched to the third coordinate system by performing a coordinate transformation on the first coordinate system with respect to a position of the plurality of cameras in a first section and on the second coordinate system with respect to a position of the at least one measurer in the first section, the position of the plurality of cameras in the first section and the position of the at least one measurer in the first section being calculated through a simultaneous localization and mapping (SLAM) algorithm.

3. The calibration device of claim 1, wherein the at least one measurer is further configured to acquire the motion information in correspondence with a rotation or movement operation of the first calibrator.

4. The calibration device of claim 1, wherein the first calibrator comprises a mover capable of moving the first calibrator in at least one of an X-axis direction, a Y-axis direction, or a Z-axis direction.

5. The calibration device of claim 4, wherein the mover comprises a first mover capable of moving the first calibrator in the Z-axis direction and a second mover capable of moving the first calibrator in at least one of the X-axis direction or the Y-axis direction.

6. The calibration device of claim 1, further comprising:
a second calibrator comprising the target,
wherein the second calibrator is configured to move in at least one of an X-axis direction, a Y-axis direction, or a Z-axis direction.

7. The calibration device of claim 1, wherein the target comprises a repeated pattern image.

8. The calibration device of claim 1, further comprising a memory configured to store the calibration image information and the calibration motion information.

9. The calibration device of claim 1,
wherein the first calibrator is further configured to rotate or move a plurality of calibration target devices, and
wherein the calibration image information and the calibration motion information are simultaneously generated with respect to the plurality of calibration target devices.

10. A calibration method comprising:
capturing an image of a target;
acquiring image information of the target;
acquiring motion information of a calibration target device by measuring an acceleration of the calibration target device and determining a rotation direction of the calibration target device;
matching a first coordinate system, the first coordinate system corresponding to a plurality of cameras configured to capture the image of the target, to a third coordinate system;
matching a second coordinate system, the second coordinate system corresponding to a measurer configured to acquire the motion information of the calibration target device, to the third coordinate system;
simultaneously performing, based on the third coordinate system, an image calibration operation with respect the image information and a motion calibration operation with respect the motion information;
generating calibration motion information via the image calibration operation with respect to the image information; and
generating calibration image information via the motion calibration operation with respect to the motion information,
wherein the third coordinate system is a standard coordinate system that unifies the first and second coordinate systems that are different from each other.

11. The calibration method of claim 10, wherein the matching comprises performing a coordinate transformation on the first coordinate system with respect to a position of the plurality of cameras in a first section and on the second coordinate system with respect to a position of the measurer in the first section, the position of the plurality of cameras in the first section and the position of the measurer in the first section being calculated through a simultaneous localization and mapping (SLAM) algorithm.

12. The calibration method of claim 10, further comprising:
rotating or moving the calibration target device through a first calibrator,
wherein the acquiring of the motion information of the calibration target device comprises acquiring the motion information in correspondence with a rotation or movement operation of the first calibrator, and
wherein the acquiring is performed by the measurer.

13. The calibration method of claim 12, further comprising moving the first calibrator in at least one of an X-axis direction, a Y-axis direction, or a Z-axis direction.

14. The calibration method of claim 10, wherein the target moves in at least one of an X-axis direction, a Y-axis direction, or a Z-axis direction.

15. The calibration method of claim 10, wherein the target comprises a repeated pattern image.

16. The calibration method of claim 10, further comprising storing the calibration image information and the calibration motion information in a memory.

17. The calibration method of claim 10, wherein the generating of the calibration motion information and the calibration image information comprises simultaneously generating the calibration image information and the calibration motion information with respect to a plurality of calibration target devices.

18. A computer program product comprising a non-transitory computer readable recording medium comprising a program to perform operations of:
capturing a target;
acquiring image information of the target;
acquiring motion information of a calibration target device by measuring an acceleration of the calibration target device and determining a rotation direction of the calibration target device;
matching a first coordinate system, the first coordinate system corresponding to a plurality of cameras configured to capture an image of the target, to a third coordinate system;
matching a second coordinate system, the second coordinate system corresponding to a measurer configured to acquire the motion information of the calibration target device, to the third coordinate system;
simultaneously performing, based on the third coordinate system, an image calibration operation with respect to the image information and a motion calibration operation with respect to the motion information;
generating calibration motion information via the image calibration operation with respect to the image information; and
generating calibration image information via the motion calibration operation with respect to the motion information,
wherein the third coordinate system is a standard coordinate system that unifies the first and second coordinate systems that are different from each other.

19. The calibration device of claim 1, wherein the measurer comprises an inertial measurement unit (IMU).

* * * * *